US008991919B2

(12) United States Patent
Neuber et al.

(10) Patent No.: US 8,991,919 B2
(45) Date of Patent: Mar. 31, 2015

(54) CHILD SAFETY SEAT FOR VEHICLES (71) Applicant: Hauck GmbH & Co. KG, Sonnefeld (DE)

(72) Inventors: Tobias Neuber, Göppingen (DE); Reinhold Unseld, Asselfingen (DE)

(73) Assignee: Hauck GmbH & Co. KG, Sonnefeld (DE)

( * ) Notice: Subject to any disclaimer, the term of this patent is extended or adjusted under 35 U.S.C. 154(b) by 83 days.

(21) Appl. No.: 13/864,737

(22) Filed: Apr. 17, 2013

(65) Prior Publication Data

US 2013/0313874 A1 Nov. 28, 2013

(30) Foreign Application Priority Data

May 22, 2012 (EP) .................................... 12168981

(51) Int. Cl.
*A47C 1/08* (2006.01)
*B60N 2/26* (2006.01)
*B60N 2/28* (2006.01)

(52) U.S. Cl.
CPC .............. *B60N 2/265* (2013.01); *B60N 2/2812* (2013.01); *B60N 2/2845* (2013.01); *B60N 2/2851* (2013.01); *B60N 2/2863* (2013.01)
USPC .................................................. 297/256.13

(58) Field of Classification Search
USPC ............... 297/256.13, 250.1, 216.11, 256.16, 297/216.19
See application file for complete search history.

(56) References Cited

U.S. PATENT DOCUMENTS

| 4,858,997 | A | * | 8/1989 | Shubin ..................... 297/256.13 |
| 5,395,154 | A | * | 3/1995 | Wang ....................... 297/256.13 |
| 6,491,348 | B1 | * | 12/2002 | Kain .......................... 297/250.1 |
| 6,779,843 | B2 | * | 8/2004 | Kain .......................... 297/250.1 |
| 7,455,358 | B2 | * | 11/2008 | Harcourt et al. ........... 297/250.1 |
| 7,547,065 | B2 | * | 6/2009 | Barger ....................... 297/250.1 |
| 7,862,117 | B2 | * | 1/2011 | Hutchinson et al. ....... 297/250.1 |
| 8,186,757 | B2 | * | 5/2012 | Duncan et al. ........... 297/256.13 |
| 8,632,124 | B2 | * | 1/2014 | Clement et al. .......... 297/216.11 |
| 2003/0151282 | A1 | | 8/2003 | Williams et al. |
| 2007/0057547 | A1 | * | 3/2007 | Hartenstine et al. ..... 297/256.13 |
| 2011/0074194 | A1 | * | 3/2011 | Weber et al. ............. 297/256.13 |

FOREIGN PATENT DOCUMENTS

| DE | 202011051484 | 1/2012 |
| EP | 0287259 | 10/1988 |
| EP | 1564065 | 8/2005 |

* cited by examiner

*Primary Examiner* — Jose V Chen
(74) *Attorney, Agent, or Firm* — Sand & Sebolt (57) ABSTRACT

A child safety seat having a seat, a backrest, and a belt device for buckling a child therein. The belt device includes a shoulder belt routed through an opening in the backrest. The opening includes a longitudinal slot extending in a longitudinal direction of the backrest in a reclining element and a belt slot in a belt guide piece. The guide piece is movable along the reclining element to adapt the position of the belt slot to the child's body. The guide piece detachably connects to the reclining element via a locking device having a locking element pretensioned by a reset force. An actuating element on the reclining element applies tensile force to the tensioning element, counter to the reset force. This moves the locking element into a release setting, thus releasing the locking device and displacing the guide piece along the longitudinal direction of the backrest.

12 Claims, 8 Drawing Sheets

CHILD SAFETY SEAT FOR VEHICLES

CROSS-REFERENCE TO RELATED APPLICATIONS

This application claims the benefit of EP 121 689 81, filed May 22, 2012.

BACKGROUND OF THE INVENTION

1. Technical Field

The invention relates to a child safety seat for vehicles.

2. Background Information

Such types of child safety seats are known from the prior art. They have a seat surface and a backrest connected to the seat surface for the child that is to be held in the child safety seat. Furthermore, they have devices for affixing the child safety seat to the vehicle seat. These devices may include, for example, retaining receptacles for the seatbelts in the vehicle if the corresponding child safety seat is to be affixed to the vehicle seat by means of said vehicle seatbelt or seatbelt system. There are also known child safety seats that may be connected to the vehicle seats or to the vehicle chassis, in the area of the vehicle seats, on their fastening systems' retainer eyelets, as is done with the so-called ISOFIX system, for example. There are also child safety seats that can be connected directly to a vehicle seat or affixed to it in that initially a base is connected to the vehicle seat via the vehicle's seatbelt or the ISOFIX system or a comparable system, and the child safety seat is then connected to the base, for example through a latching system formed in the base and the actual child safety seat.

Furthermore, such types of child safety seats have their own belt system for buckling up the child being held in the seat. Such types of belt devices have at least one shoulder belt, which is routed through an opening in the backrest and proceeds partially onto a backside of the backrest. The backrest can be subdivided into a reclining element and a belt guide piece that can be moved relatively with respect to this, wherein at least one longitudinal slot extending in the longitudinal direction of the backrest is disposed in the reclining element and one belt slot is disposed in the belt guide piece. Due to the extension of the belt guide piece in the longitudinal direction of the backrest, the height of the belt slot and thus the outlet height of the at least one shoulder belt, which is routed through the belt slot, out of the backrest on its front, is adjusted and thus the belt position is adapted to the body size of the child.

Because a corresponding adjustment and adaptation of the position of the belt guide piece must take place such that once a position is adjusted, it is reliably maintained, a locking device is provided with such types of child safety seats, which has a locking element, which is pretensioned in a locking setting due to reset force, and which further has an actuating element for loosening the locking element from its locking setting and enabling an extension of the belt guide piece. With common child safety seats, all of these elements are fully contained on a backside of the reclining element.

Corresponding common child safety seats are known, for example, from EP 2 066 526 B1 as well as from U.S. Pat. No. 6,030,047 and U.S. Pat. No. 6,491,348.

With the child safety seats disclosed in the listed prior art, which involve seats for small children, which are seats of the so-called 0/0+ group or group 1, the mechanism for height adjustment of the seat-specific belt device is operated from the backside of the child safety seat, or more specifically from the backside of the backrest, wherein a respective actuating element on the back must be accessed, which means that the back of the child safety seat must be released and made accessible.

EP 2 208 637 A1 discloses a further example of a child safety seat in which, however, not all of the elements of the locking device are disposed on the backside of the reclining element. Release levers are provided therein and routed to the front side of the reclining element and can be actuated from the front side of the child safety seat in order to adjust the height of the belt device, even on a child safety seat that is installed in the vehicle and whose backside is not accessible. Thus, in this case, height adjustment of the belt guide piece for adapting the belt device to the body size of the child, though different than with the aforementioned solutions, common and known from the prior art, is enabled even when the child safety seat is installed in the vehicle; however, the handles, as parts of the release levers, are not located on the backside of the reclining element, which is different than the commonly known prior art, but are instead located laterally all the way to the area in which the head of the child being held in the child safety seat rests; and, in an extreme case, this could cause inherent risk of injury during a side impact crash. In this regard, this most recently described solution according to EP 2 208 637 A1 must be considered disadvantageous and unfavorable.

SUMMARY

The objective of the invention is thus to further develop a common prior art, as it is disclosed in EP 2 066 526 B1 and U.S. Pat. No. 6,030,047 as well as U.S. Pat. No. 6,491,348 to the extent that it is possible to release the locking device and thus extend the belt guide piece and adapt the belt device to the body size of the child being held in the child safety seat, in a simple and reliable manner, without the routing of elements of the locking device from the backside of the reclining element to other locations, even when the child safety seat is already installed in the vehicle and even when the child is already seated in the child safety seat.

According to the invention, with a common child safety seat of the type described at the beginning, the actuating element is a tensioning element on the backside of the reclining element routed in the direction of its upper longitudinal end, wherein when tensile force is applied to the tensioning element, the locking element can be brought from the locked setting into the released setting against the reset force, in which it triggers a release of the locking device, thus enabling displacement of the belt guide piece in the longitudinal direction of the backrest.

Such type of tensile element routed in the direction of the upper end of the reclining element can also be accessed even when the child safety seat is already on a vehicle seat in the vehicle and connected therein and even if a child is already being held in the seat; thus, said element can be used to disengage the locking device via tensile actuation in order to adjust to the correct height position of the belt guide piece and adapt the belt device to the body size of the child. Therefore, it is not necessary to detach the child safety seat from the vehicle seat in order to undertake a corresponding adjustment. Instead, the correct belt height adjustment can be carried out when the child has already taken up the required space in the child safety seat, which means that the belt height can be adjusted very precisely to the body size of the child, which, as a whole, will contribute to improved safety of the child in the seat.

The tensioning element can be in any suitable form, for example in the form of a tensioning rod, a tensioning cord, or a tensioning chain. A flat textile strap or a textile belt is especially preferred in this case. Such type of strap or especially such type of belt is, on the one hand, flexible and does not cause any risk of injury even if it protrudes in an area on the upper end of the reclining element. On the other hand, such type of belt or such type of strap can also be designed to have sufficient tensile strength so that it is stable for a long period of time and over a large number of actuation cycles.

The locking device comprises, as a locking element, one locking rod, guided through at least one longitudinal slot running transversally to a tangential plane of the backrest and formed in an extension of the belt guidance part rigidly connected to said backrest, at least two holding receptacles, formed in different longitudinal positions of the reclining element, for the positive-locking retaining of at least a section of the locking rod, and a guide carriage exhibiting a guide slot disposed on the belt guidance part and running, at least in sections, transversally to the tangential plane and also transversally to the longitudinal slot, which guide carriage can be displaced relative to said belt guidance part in the longitudinal direction of the backrest, then a correspondingly simply and reliable locking device that can be actuated with a tensile element can be created.

Due to the interaction between the longitudinal slots, formed in the extensions, transverse to a tangential plane in the backrest, which slots particularly and primarily may run orthogonally with respect to said tangential plane, and the guide slot in the guide carriage, which runs both transversely with respect to the direction of extension for the longitudinal slot as well as transversely with respect to the tangential plane, the locking rod, which, in particular, may have a circular diameter, being routed through both the longitudinal slot as well as the guide slot when there is a corresponding movement of the guide carriage, upon a displacement of the guidance carriage can be moved outward, i.e. away from the backrest element, or, respectively, inward. i.e. back toward it, depending on the direction of said displacement in the longitudinal slot. This results in a lifting of the locking rod out of the at least one retaining receptacle, in which it is being held and rests in a locking setting with positive-locking, or in a lowering of the locking rod into such type of retaining receptacle for locking into a selected position. The movement conversion mechanics formed by the described method enables the transference of a tensile force directed essentially tangentially with respect to the backrest or a corresponding tensile movement in a transverse movement of the locking rod, directed, particularly for the most part, vertically thereto, from at least one retaining receptacle, in which it is resting in a locked position, or into such, wherein the reset force forces the locking rod into the retaining receptacle. In this process, the tensioning element can be, advantageously, directly connected to the guide carriage.

In doing so, the guide slot can be curved, at least in one section. In this advantageous embodiment, the guide slot differs, particularly, from the longitudinal slot, which extends, particularly, in a straight line. Due to the curved progression of the guide slot, in this advantageous embodiment a resulting movement of the locking rod is obtained, wherein this movement can be adjusted through the type and progression of the curve in that the locking rod is initially released slowly and slightly from its locking setting and subsequently lifted with a quicker movement, with the steeper progression of the guide slot as compared to the tangential plane, when further removed from the backrest and from the locking setting.

The guide carriage is preferably secured in a forcibly actuated manner to the belt guide piece according to a further advantageous embodiment. This prevents the guide carriage from falling or otherwise detaching from the belt guide piece. The enforced guidance determines the direction of motion for the guide carriage.

Bedstops can advantageously be disposed to limit the lines of movement for the guide carriage against the belt guide piece.

The guide slot is particularly designed in the guide carriage such that it extends from an upper end of the guide carriage facing toward the upper end of the backrest to a lower end of the guide carriage facing the lower end of the backrest, away from the backside of the backrest. This design and guidance of the guide carriage results in a forcibly actuated movement of the locking rod away from the reclining element when the guide carriage moves toward the upper end of the reclining element, particularly, when it is pulled by the tensioning element rigidly attached to the guide carriage.

According to a further advantageous embodiment of the invention, a bearing bracket, permanently disposed on the belt guide piece, can be provided, as well as a spring element, disposed on the lower end of the guide carriage between said bearing bracket and a front surface, which spring element is used to apply the reset force to the locking element by pushing the guide carriage toward the upper end of the backrest, whereby the locking rod is forced, in a forcibly actuated manner, through the guide and the longitudinal slot toward the backside of the reclining element, into the at least one retaining receptacle, in the locking setting. The spring element may advantageously be a helical spring.

The retaining receptacles into which the locking rod can extend, and in which it may be fixed in order to lock in a positive-locking manner, may be designed, particularly advantageously, with two retaining receptacle strips disposed on the backside of the reclining element said retaining receptacle strips are permanently connected to the reclining element and positioned opposite one another and essentially extend in a longitudinal direction of the backrest. Within these retaining receptacle strips, there is a plurality of retaining receptacles disposed and/or formed, of which respectively two are positioned correspondingly at the same longitudinal position, in order to allow for positive locking retaining of the locking rods at various positions along the longitudinal direction. A pair of retaining receptacles, disposed at the same longitudinal position and contained in one of the retaining receptacle strips each, then forms, as a whole, the retaining receptacle for the locking rod in a height and locking setting of the belt guide piece.

According to a further advantageous embodiment of the invention, a headrest may be disposed at the belt guide piece on the front of the reclining element. This headrest is then moved simultaneously in the longitudinal direction of the backrest and its height is also adjusted and adapted to the body size of the child being held in the child safety seat when the height adjustment is being carried out for the belt guide piece. The headrest is moved to the position at which the head of the child is at rest when the child's body rests against the backrest in a relaxed state. This headrest advantageously has side pieces for securing the head of the child at the sides. These side pieces are intended to particularly absorb the lateral forces acting on the child's head in the event of a corresponding side impact or accident. The headrest can advantageously be connected, as a joint, to the belt guide piece around a rotational axis proceeding substantially in the transverse direction of the backrest. Such type of joint-like connection enables the headrest to be tipped over, for example to adapt to a curve in the backrest, as is frequently the case, particularly with child safety seats in group 0/0+. In particular, safety in the event of an accident is also improved, however, by such type of joint-like connection. This type of joint means specifically, in the event of an impact or through a back pulse of the child's head subsequent to this, the child's head may displace together with the headrest, and when the head subsequently moves backward, contact of the head to or in the headrest is significantly improved. This results, in particular, in extensive covering of the side pieces of the headrest with the child's head.

The belt guide piece can advantageously be formed through a belt guide plate disposed on the backside of the reclining element, in which the belt guide slots, formed transversely with respect to the longitudinal slots, are appropriately disposed.

BRIEF DESCRIPTION OF THE DRAWINGS

Further advantages and features of the invention may be derived from the following description of an exemplary embodiment in reference to the enclosed figures. The following is shown.

DETAILED DESCRIPTION

The figures show a potential implementation of a child safety seat for vehicles according to the invention in various views and with various positions of the child safety seat 1 with its own belt device as well as its own locking device by means of an exemplary embodiment in the form of a child safety seat 1, which is designed for secure and safe placement and transport of a small child in a vehicle and belonging to group 0/0+. Obviously, the invention can also be implemented with a child safety seat from another class, for example of group 1.

The child safety seat 1 according to the exemplary embodiment has a seat surface 2 and a backrest 3 connected to said seat surface 2. A belt hook 4 disposed on the backside of the backrest 3 as well as two belt retaining receptacles 5 disposed laterally adjacent to the seat surface 2 serve, in the customary and known manner, to hold the shoulder belt section in a threaded-in manner (in the belt hook 4) as well as the pelvis belt section (through the belt receivers 5) of a three-point belt located in the vehicle, in order to connect the child safety seat 1 onto a vehicle seat against the direction of travel, e.g. the front passenger's seat or a rear seat of the vehicle.

The child safety seat 1 further has a belt device formed on same and disposed thereon, shoulder belts 6 formed as a type of suspender belts (only shown here in one section), as well as a belt buckle in the area of the seat surface 2, which is not shown here.

Two longitudinal slots 7 are formed in parallel in the backrest 3 and in the longitudinal direction of the backrest 3. These longitudinal slots 7 are formed in a reclining element 8 which is rigidly connected to the seat surface 2. A belt guide piece 9 is disposed on the surface opposite the front side of the backrest 3, on which front side a child placed in the child safety seat 1 sits, and has belt slots 10 through which the shoulder belts 6 are routed from the back of the backrest 3 to the front. A headrest 11 is disposed, with a joint-like connection, at the guide belt piece 9, which guide belt piece 9 being displaceable relative to the reclining element 8 and in the longitudinal direction of the backrest 3. A carrying handle 13, which can be swiveled about a swiveling axis 12, is used to grasp and transport the child safety seat 1 in a known manner.

A locking device 14 is formed on the back of the backrest 3, by means of which the belt guide piece 9 can be adjusted in various possible positions with respect to the reclining piece 8 and can be fixedly locked in its position with respect to the latter. In doing so, the belt guide piece 9 comprises a cover plate 15 disposed entirely on the back of the backrest 3, which covers the longitudinal slots 7.

In the enlarged representations of FIGS. 3a, 4a, 6a, 7a, 8a, and 9a, the locking device 14 is shown in greater detail in various positions and various views. In this regard, as the locking device 14 is described in greater detail in the following, the aforementioned figures are referred to in particular.

The locking device 14 has two opposing retaining receptacle strips 17, which extend in the longitudinal direction of the backrest 3 and which are fixedly connected to the reclining element 8 and which, at corresponding longitudinal positions, each have retaining receptacle notches 16. The locking device 14 further comprises a locking rod 18, which has a circular diameter, the ends of which can be accommodated in a respective retaining receptacle notch 16 of each of the two retaining receptacle strips 17 in order to be locked against a longitudinal movement. The locking rod 18 is routed through longitudinal slots 20 formed with the extensions 19 fixedly connected to the cover plate 15 of the belt guide piece 9, wherein the longitudinal slots 20 and the extensions 19 are dimensioned such that the locking rod 18 can be moved in the longitudinal slots 20 transverse to the plane of the backrest 3, particularly, therefore, also transverse to the cover plate 15, to the extent that it is completely lifted from the retaining receptacle notches 16 of the retaining receptacle strips 17 and thus enables a relative displacement of the belt guide piece 9 with respect to the reclining piece 8.

In a guide 21, provided with stops for limiting movement that are not shown in more detail here, formed at the cover plate 15 of the belt guide piece 9 and fixedly connected with said piece, a guide carriage 22 is disposed, which can be moved relative to said guide 21 and thus to the belt guide piece 9 in the longitudinal direction of the backrest 3.

In this exemplary embodiment, the guide carriage 22 has two legs 22a, each of which has a guide slot 23. The locking rod 18 runs through these guide slots 23, wherein the guide slots 23 have a progression that, in any case, in a section of which proceeds transversely with respect to the longitudinal extension of the longitudinal slots 19, as well as transversely with respect to the tangential plane of the backrest 3, by that also transversely with respect to the plane of the cover plate 15. In particular, the progression of the guide slots 23 is curved.

By means of a helical spring 25 placed between the guide carriage 22 and a counter bearing 24 fixedly connected with the cover plate 15, the guide carriage 22 is forced into a position maximally displaced in the direction of the seat surface 2 relative to the cover plate 15 and thus relative to the belt guide piece 9.

As can be seen from a representation that is only shown in sections, the shoulder belts 6 run on the back of the backrest 3 over the locking rod 18 onward and are looped around said rod.

A tensioning belt 26 is connected to the guide carriage 22. Said tensioning belt 26 is threaded through the headrest 11 with a free end opposite the end connected to the guide carriage 22, and protrudes out over the backside of this element.

By pulling on the tensioning belt 26, the guide carriage 22 is moved, against the spring force of the helical spring 25 relative to the belt guide piece 9, more precisely to the corresponding cover plate disposed on, and belonging to, the belt guide piece, in the direction of the upper end of the backrest 3. As a result, the locking rod 18 is forcibly actuated outward in the longitudinal slots 20 and out of the retaining receptacle notches 16 of the retaining receptacle strips 17, forced by guidance of the guide carriage acting towards the lower end of the guide carriage 22 pointing toward the seat surface 2, away from the backside of the backrest 3 as well as transversally to the plane of the backrest 3. The belt guide piece 9 can then be moved relative to the reclining piece 8 in the longitudinal direction of the back, e.g. from the uppermost position shown in FIGS. 2 to 4a toward a bottommost position shown in FIGS. 5 to 7a or vice versa. Obviously, the belt guide piece 9 can also be locked in any of the potential intermediate positions in between, which are predetermined through the retaining receptacle notches formed at the various longitudinal positions of the retaining receptacle strips 17. If the tensioning belt 26 is released, the force of the helical spring 25 forces the guide carriage 22 back into its base position displaced into the direction toward the seat surface 2 in which the guide slot 23 follows a course close lying to the backrest, such that the locking rod 18 is forced in the direction toward the backrest 3 and pushed into suitable retaining receptacle notches 16 in the retaining receptacle strips 17 and is held there in the corresponding locking setting.

Due to the fact that, on the front of the backrest 3, the headrest 11 is attached to the belt guide piece 9 such that it cannot be displaced in the longitudinal direction of the backrest 3 (only being able to swivel in a direction parallel to the extension of the locking rod 18, i.e. transverse to the longitudinal direction of the backrest 3, together with adjusting the correct position of the belt guide piece 9, and thus adjusting the corresponding distance of the belt slot 10, and thus the outlet position of the shoulder belt 6, to the seat surface 2 for a corresponding adaptation to the body size of the child to be accommodated in the child safety seat 1 the headrest 11 is also adjusted.

The great advantage of the embodiment according to the invention exists in that the tensioning belt 26 is easy to reach even when the child safety seat 1 is already installed and permanently positioned in the vehicle, and a child has already been placed in the child safety seat 1, and that, the blocking device 15 can be adjusted with said belt in order to correctly adjust the position of the belt slots 10, and thus the distance of the passage of the shoulder belts 6 through the backrest 3 to the seat surface 2, and that this can be done with a few simple manipulations by hand. If the distance needs to be increased, with a simultaneous pulling on the tensioning belt 26 to release the locking device 15, a movement of the belt guide piece 9 and the associated headrest 11, toward the upper end of the backrest can also be carried out, e.g. in order to move the headrest 11 out of the lower positions shown in FIGS. 5 to 7a into an upper position shown in FIGS. 3 to 4a, or any intermediate position.

Figure 1:
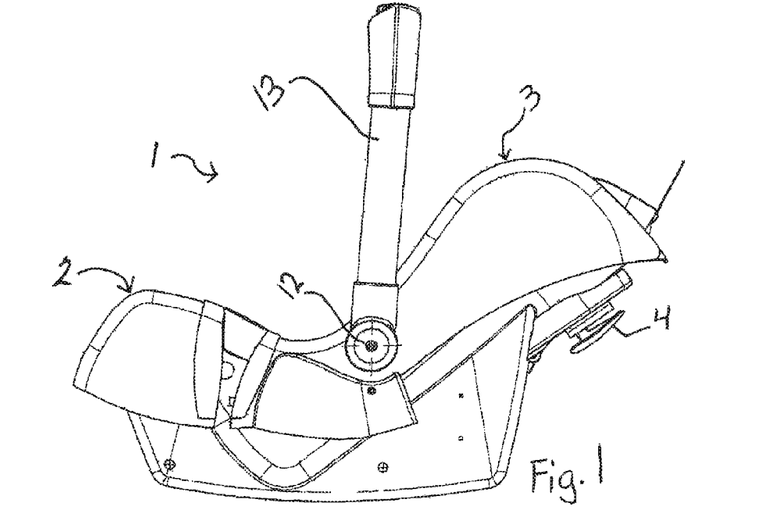
FIG. 1 shows a side view of an exemplary embodiment of a child safety seat according to the invention.
Figure 2:
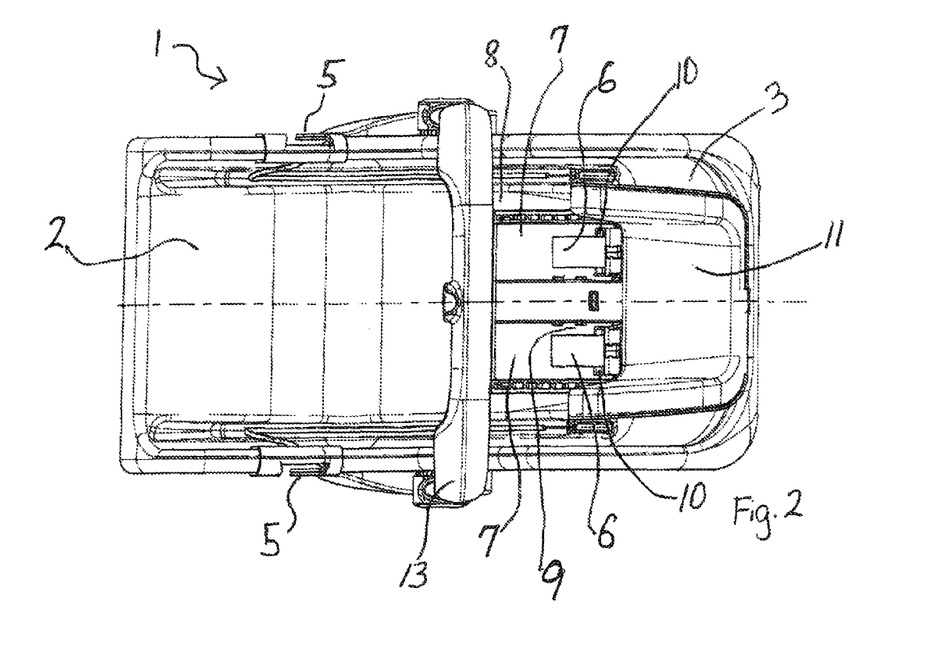
FIG. 2 shows a top view of the child safety seat according to FIG. 1 with the belt guide piece and the headrest set at the highest setting.
Figure 3:
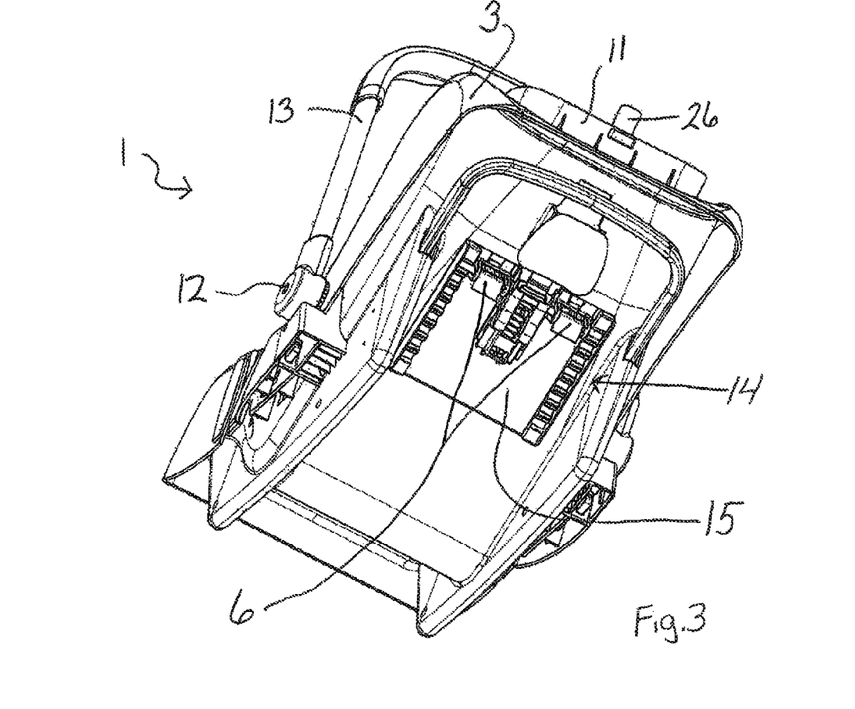
FIG. 3 shows a perspective view of the child safety seat from the bottom rear in the position with the belt guide piece and the headrest at the highest setting.
Figure 3A:
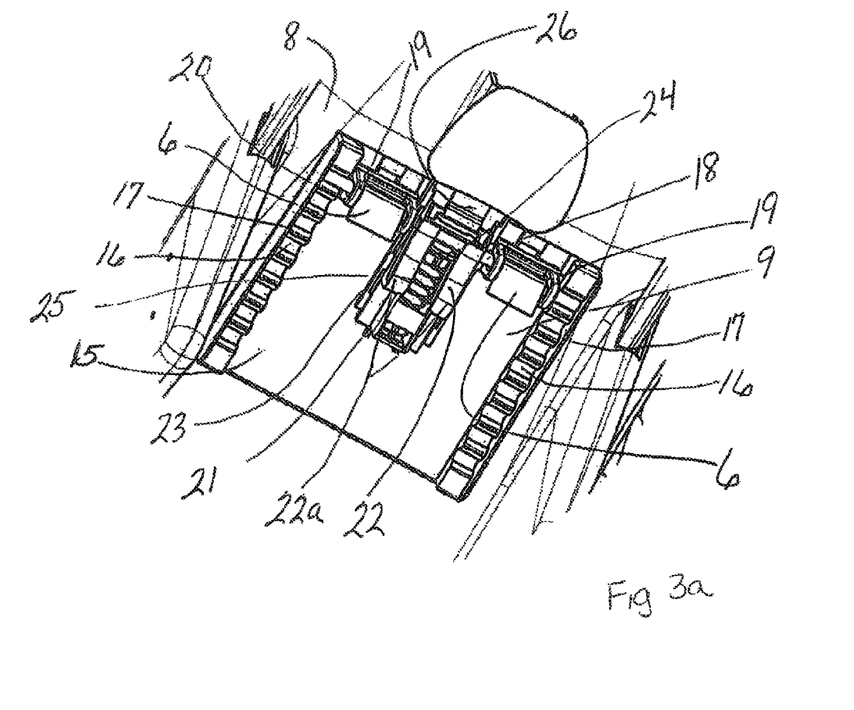
FIG. 3a shows an enlarged sectional representation of the locking device in the position shown in FIG. 3.
Figure 4:
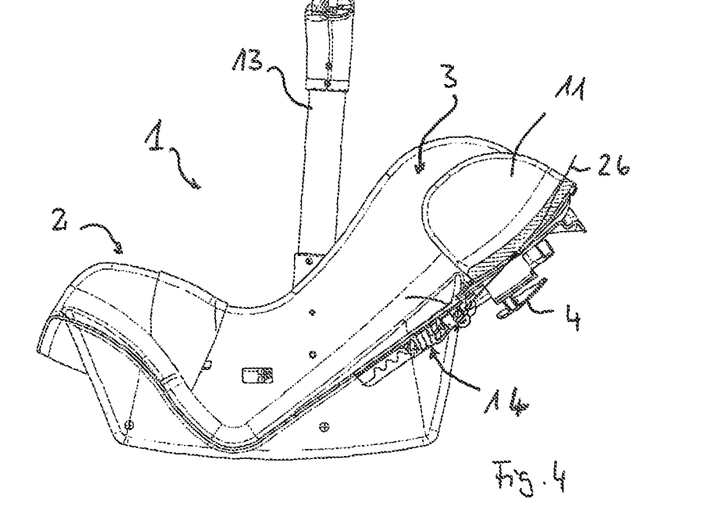
FIG. 4 shows a longitudinal section through the child safety seat with the combination of the belt guide piece and the headrest at the highest setting.
Figure 4A:
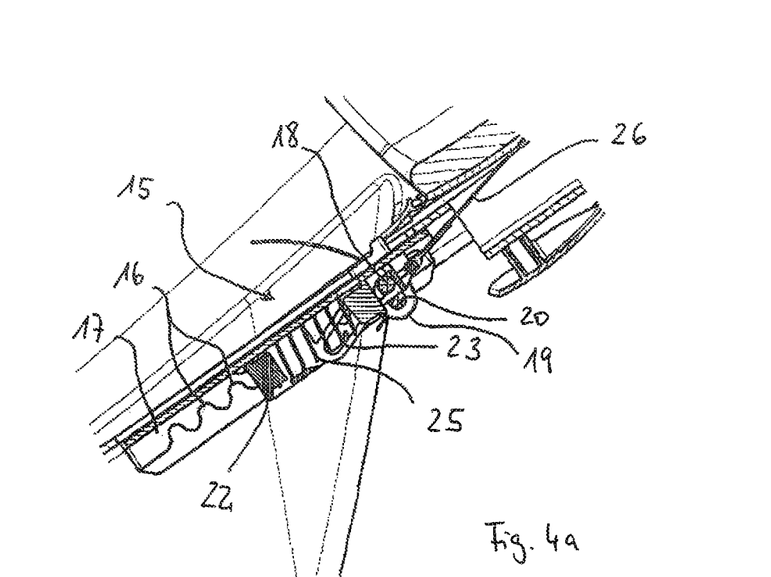
FIG. 4a shows a sectional view of the locking device from FIG. 4.
Figure 5:
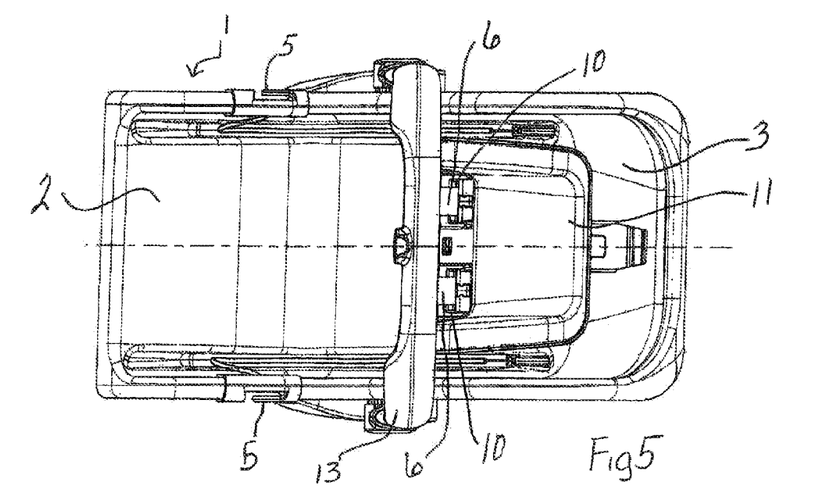
FIG. 5 shows a top view of the child safety seat with the belt guide piece and the headrest in the lowest position.
Figure 6:
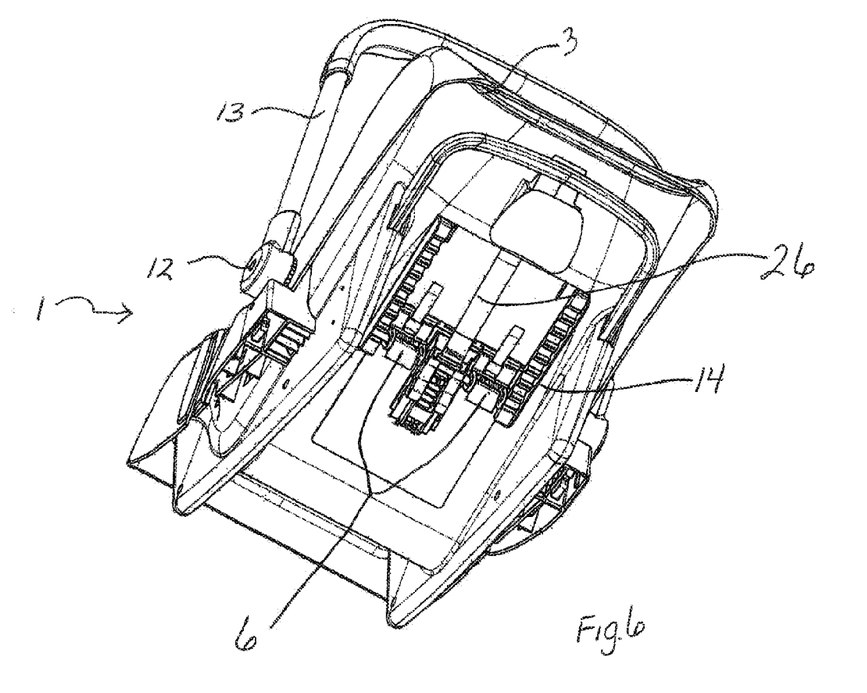
FIG. 6 shows a perspective view from the bottom rear of the child safety seat in the setting and positioning with the belt guide piece in the headrest in the lowest possible position according to FIG. 5.
Figure 6A:
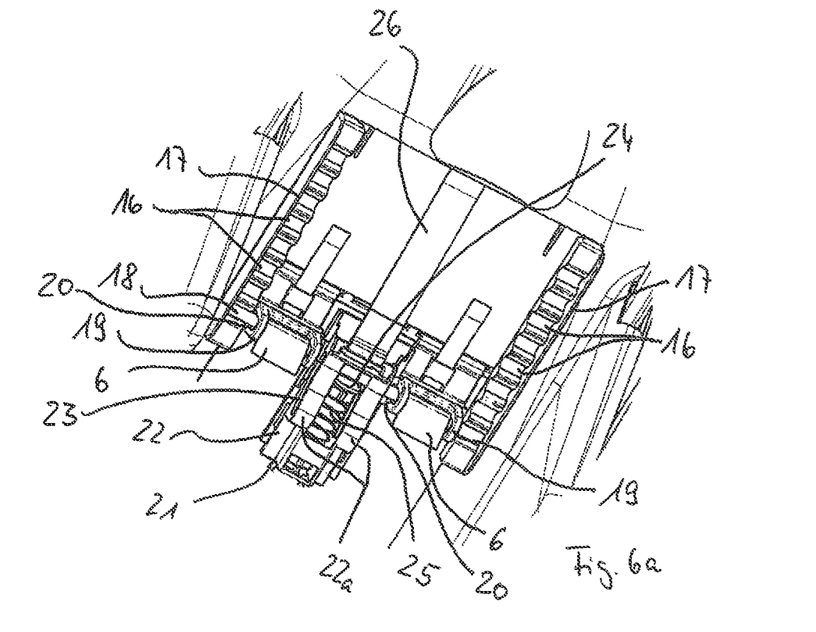
FIG. 6a shows a sectional enlargement of the locking device from FIG. 6.
Figure 7:
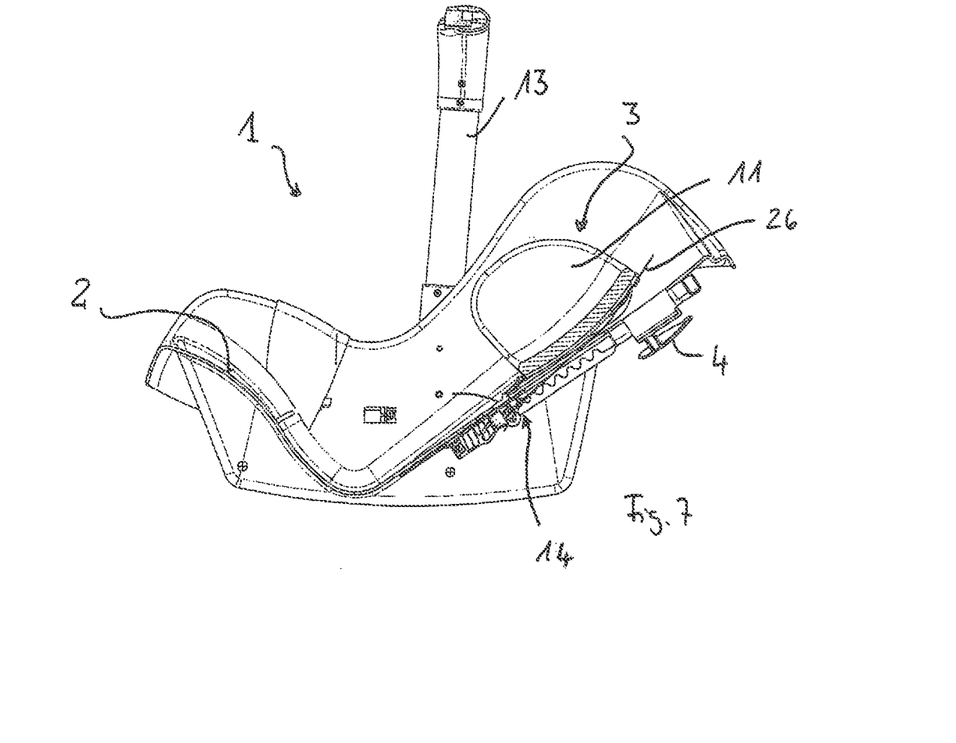
FIG. 7 shows a longitudinal representation of the child safety seat with the adjustment and position of the belt guide piece and the headrest according to FIG. 5.
Figure 7A:
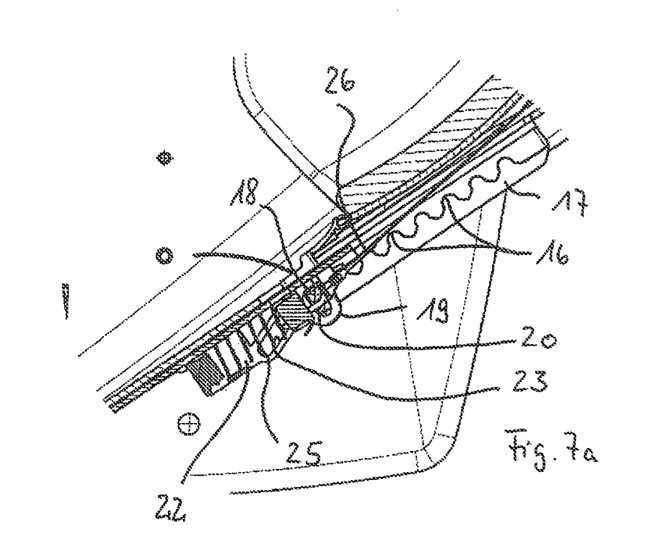
FIG. 7a shows an enlarged sectional view of the locking device from FIG. 7.
Figure 8:
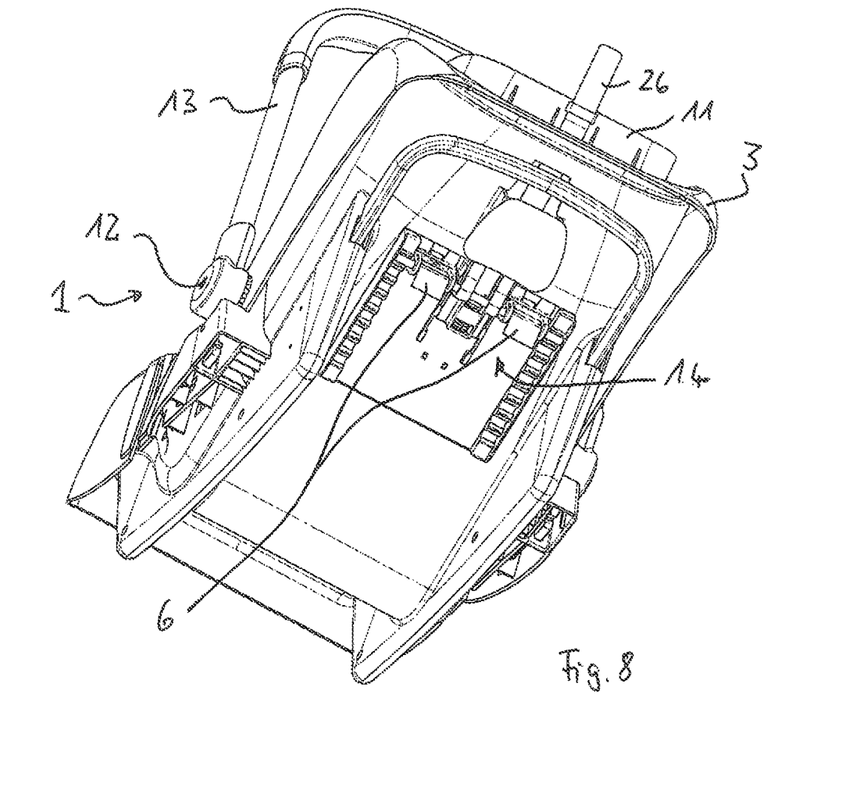
FIG. 8 shows a perspective view from the bottom rear of the child safety seat with the belt guide piece in the headrest in the highest position and with the locking device released due to pulling on the actuating element.
Figure 8A:
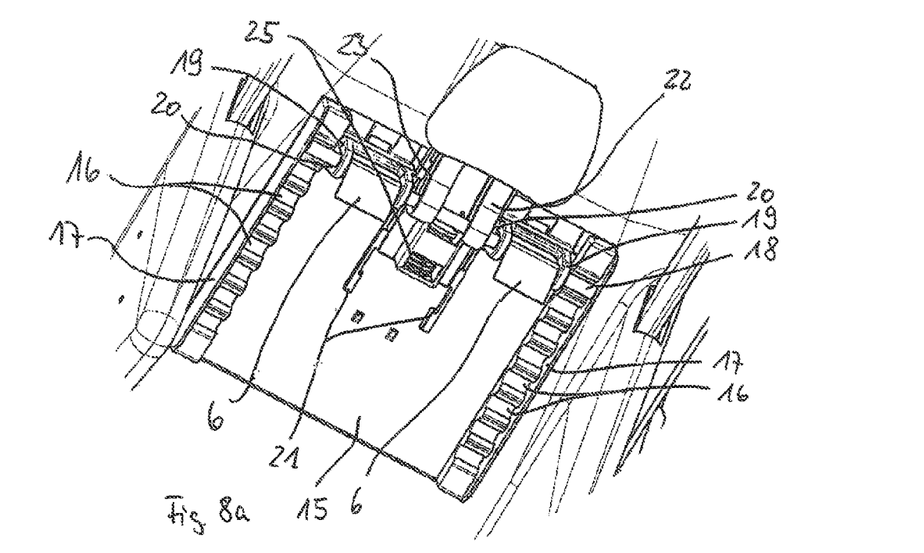
FIG. 8a shows an enlarged sectional view of the locking device from FIG. 8.
Figure 9:
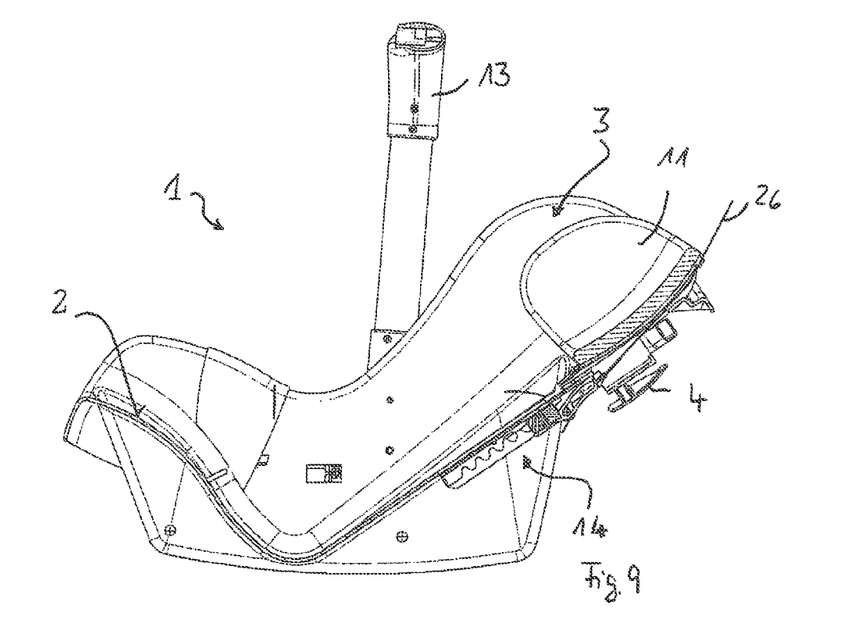
FIG. 9 shows a longitudinal section of the child safety seat with the belt guide piece and the headrest at the highest position and with the locking device placed in the release setting due to pulling on the actuating element.
Figure 9A:
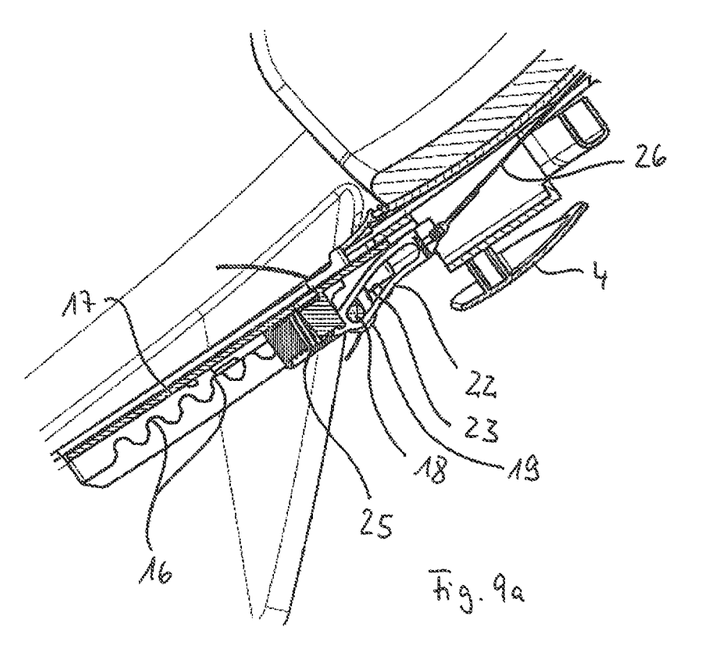
FIG. 9a shows a sectional view of the locking device according to FIG. 9.

FIGS. 8 to 9a once again show the situation in which the guide carriage 22 is moved toward the upper end of the backrest 3 relative to the belt guide piece 9 and the cover plate 15 disposed thereon by applying tensile force to the tensioning belt 26 such that, due to the enforced guidance formed from the guide slots 23 and the longitudinal slots 20, the locking rod 18 is lifted up from the retaining receptacle strips 17 to the extent that it is moved up over the retaining receptacle notches 16 and the belt guide piece 9 is released relative to the reclining piece 8.

REFERENCE LIST

1 Child safety seat
2 Seat surface
3 Backrest
4 Belt hook
5 Belt retaining receptacle
6 Shoulder belt
7 Longitudinal slot
8 Reclining element
9 Belt guide piece
10 Belt slot
11 Headrest
12 Swiveling axis
13 Carrying handle
14 Locking device
15 Cover plate
16 Retaining receptacle notch
17 Retaining receptacle strip
18 Locking rod
19 Extension
20 Longitudinal slot
21 Guide
22 Guide carriage
22a Leg
23 Guide slot
24 Counter bearing
25 Helical spring
26 Tensioning belt

The invention claimed is:
1. A child safety seat for vehicles comprising:
a seat surface;

a backrest connected to the seat surface, said backrest having a front side and a backside;

means for connecting the child safety seat to a vehicle seat in a vehicle;

a belt device disposed on the child safety seat for buckling the child into the child safety seat, wherein the belt device includes at least one shoulder belt;

a reclining element provided on the backrest, said reclining element having a front side adapted to be contacted by a child seat in the child safety seat;

a longitudinal slot defined in the reclining element and extending from the front side of the reclining element to the backside thereof, said longitudinal slot extending in a longitudinal direction of the backrest;

a belt guide piece detachably connectable to the reclining element in one of at least two different positions;

a belt slot defined in the belt guide piece; wherein the longitudinal slot in the reclining element and the belt slot in the belt guide piece together define an opening in the backrest which extends from the front side of the backrest to the backside thereof, wherein the at least one shoulder belt is routed through the opening in the backrest; and wherein the belt guide piece is movable, in the direction of the backrest, along the reclining element and relative thereto in order to adapt the position of the belt slot to the body size of the child to be seated in the child safety seat;

a locking device entirely disposed on the backside of the reclining element;

a locking element provided on the locking device and being movable between a locking setting and a release setting;

a spring element operatively connected to the locking element and biasing the locking element into the locking setting, and when the locking element is in said locking setting, the locking element prevents a displacement of the belt guide piece relative to the reclining element;

an actuating element provided on the locking device and disposed such that the actuating element is behind the child when said child is sitting in the child safety seat; said actuating element being operatively connected with the locking element to selectively release the locking element from the locking setting, and wherein the actuating element is a tensioning element provided on the backside of the reclining element and routed toward an upper longitudinal end thereof; and wherein, through application of tensile force onto the tensioning element counter to a reset force applied by the spring element, the locking element is movable from the locking setting to the release setting and when the locking element is in the release setting displacement of the belt guide piece along the longitudinal direction of the backrest is enabled.

2. The child safety seat according to claim 1, wherein the locking element comprises:

a locking rod;

an extension fixedly connected to the belt guide piece;

at least one longitudinal slot defined in the extension and oriented transverse to the tangential plane of the backrest; and wherein said locking rod is guided through the at least one longitudinal slot defined in the extension;

at least two retaining receptacles formed in different longitudinal positions on the reclining element for retention of at least one section of the locking rod; and a guide carriage, disposed on the belt guide piece, such that the guide carriage is longitudinally displaceable in relation to said belt guide piece in the longitudinal direction of the backrest; and a guide slot defined in the guide carriage, said guide slot being oriented in part transversally to the tangential plane of the backrest thereby transversally to the longitudinal slot defined in the backrest.

3. The child safety seat according to claim 2, wherein the guide slot runs in a curved manner, at least in one section.

4. The child safety seat according to claim 2, wherein the guide carriage is fixedly secured to the belt guide piece.

5. The child safety seat according to claim 2, further comprising stops disposed on the belt guide piece to limit the longitudinal movement of the guide carriage.

6. The child safety seat according to claim 2, wherein the guide slot, starting from an upper end of the guide carriage facing toward an upper end of the backrest to a lower end of the guide carriage facing toward a lower end of the backrest, extends away from the backside of the reclining element.

7. The child safety seat according to claim 6, wherein the spring element is disposed between a counter bearing fixedly disposed on the belt guide piece and a front surface at the lower end of the guide carriage; and wherein the reset force applied by the spring element is directed in the direction of the lower end of the backrest.

8. The child safety seat according to claim 7, wherein the spring element is a helical spring.

9. The child safety seat according to claim 2, further comprising two retaining receptacle strips which are disposed opposite one another on the backside of the reclining element, and which are fixedly connected to the latter and substantially run in the longitudinal direction of the backrest, in which strips a plurality of retaining receptacles are disposed, at corresponding longitudinal positions for a positive-locking retaining of the locking rod at various positions along the longitudinal direction.

10. The child safety seat according to claim 1, wherein a headrest is disposed on the belt guide piece on the front side of the reclining element.

11. The child safety seat according to claim 10, wherein the headrest is connected in an articulated manner to the belt guide piece about a rotational axis running substantially in the direction transverse to the backrest.

12. The child safety seat according to claim 1, further comprising a plate disposed on the backside of the reclining element as a component of the belt guide piece.

* * * * *